US007425698B2

(12) United States Patent
Warren et al.

(10) Patent No.: US 7,425,698 B2
(45) Date of Patent: Sep. 16, 2008

(54) FEEDBACK INFLUENCED INCREASED-QUALITY-FACTOR SCANNING PROBE MICROSCOPE

(76) Inventors: Oden L. Warren, c/o The University of Western Ontario, Room 319, Stevenson-Lawson Building, London, Ontario (CA) N6A 5B8; Peter R. Norton, c/o The University of Western Ontario, Room 319, Stevenson-Lawson Building, London, Ontario (CA) N6A 5B8; John F. Graham, c/o The University of Western Ontario, Room 319, Stevenson-Lawson Building, London, Ontario (CA) N6A 5B8

( * ) Notice: Subject to any disclaimer, the term of this patent is extended or adjusted under 35 U.S.C. 154(b) by 52 days.

(21) Appl. No.: 11/495,403

(22) Filed: Jul. 28, 2006

(65) Prior Publication Data
US 2006/0261264 A1    Nov. 23, 2006

Related U.S. Application Data

(63) Continuation of application No. 11/240,312, filed on Sep. 30, 2005, now abandoned, which is a continuation of application No. 10/673,266, filed on Sep. 30, 2003, now abandoned, which is a continuation of application No. 10/158,826, filed on Jun. 3, 2002, now abandoned, which is a continuation of application No. 09/188,567, filed on Nov. 10, 1998, now abandoned.

(51) Int. Cl.
*H01J 3/14* (2006.01)
*G01N 23/00* (2006.01)
*G01B 5/28* (2006.01)

(52) U.S. Cl. .................. 250/234; 250/306; 73/105
(58) Field of Classification Search ............... 250/234, 250/306, 307; 73/105
See application file for complete search history.

(56) References Cited

U.S. PATENT DOCUMENTS 5,450,746 A * 9/1995 Howard .................... 73/105
5,742,377 A * 4/1998 Minne et al. ............... 355/71
5,874,668 A * 2/1999 Xu et al. .................... 73/105

* cited by examiner

Primary Examiner—Thanh X Luu
(74) *Attorney, Agent, or Firm*—Nawrocki, Rooney & Sivertson, P.A.

(57) ABSTRACT

An interfacial force microscope includes a differential-capacitance displacement sensor having a tip mounted on an oscillating member. The sensor generates displacement signals in response to oscillations of the member. A scanner is adjacent the sensor and supports a sample to be imaged. The scanner is actuable to move the sample relative to the sensor to bring the tip into intermittent contact with said sample as the member oscillates. A controller is in communication with the sensor and the scanner. The controller includes a sensor feedback circuit receiving the displacement signals and an AC setpoint signal. The AC setpoint signal has a frequency generally equal to the frequency at the peak of the displacement versus frequency curve of the sensor. The output of the sensor feedback circuit is applied to the sensor to oscillate the member. The controller also provides output to the scanner in response to the displacement signals to control the separation distance between the sensor and the sample.

32 Claims, 7 Drawing Sheets

Air

Hexadecane (3.34 cP)

concavity

Glycerol (1490 cP)

Height          Error          Phase

FEEDBACK INFLUENCED INCREASED-QUALITY-FACTOR SCANNING PROBE MICROSCOPE

This is a continuation of application Ser. No. 11/240,312 filed on Sep. 30, 2005, now abandoned which is a continuation of U.S. patent application Ser. No. 10/673,266 filed on Sep. 30, 2003, now abandoned, which is a continuation of U.S. patent application Ser. No. 10/158,826 filed Jun. 3, 2002, now abandoned, which is a continuation of U.S. patent application Ser. No. 09/188,567, filed Nov. 10, 1998, now abandoned.

FIELD OF THE INVENTION

The present invention relates generally to imaging and in particular to a method and apparatus for intermittent contact imaging.

BACKGROUND OF THE INVENTION

Atomic-force microscopy has become widely used to image surfaces of samples on a microscopic scale. Its popularity to a large extent is due to the fact that an atomic-force microscope (AFM) measures the force or force gradient between a sharp tip disposed on a cantilever and a sample surface at a picoNewton (pN) level as opposed to the tunneling current measured with a scanning tunneling microscope (STM). This of course allows the AFM to image insulating as well as conducting samples.

AFMs can be operated in either contact or intermittent contact modes. When operating in a contact mode, the deflection of a weak cantilever is kept constant while servoing the vertical extension of a piezoelectric scanner supporting the sample being imaged. The piezoelectric scanner is also rastered in an x-y plane to scan the surface of the sample. A map of the vertical extension of the piezoelectric scanner at various x,y coordinates of the sample surface, which is assumed to be proportional to a change in voltage on the piezoelectric scanner, reflects the topography of the sample surface. Unfortunately, problems exist in that soft samples are often damaged by the plowing action of the tip on the sample as the sample is rastered by the piezoelectric scanner in the x-y plane.

When operating in an intermittent contact mode, the base of a stiff cantilever is driven by a piezoelectric element which induces an oscillation at the free end of the cantilever. By driving the cantilever near its resonant frequency, an oscillation amplitude ranging from 20 to 100 nm at the free end of the cantilever can be achieved. This amplitude range is sufficient to inhibit the tip from sticking to the sample surface during each contact. To generate the image, the vertical extension of the piezoelectric scanner is servoed to maintain a constant drop in the oscillation amplitude. The piezoelectric scanner is also rastered in an x-y plane to scan the surface of the sample. In order to achieve high sensitivity, a high quality factor (Q) is necessary. Tapping mode cantilevers typically have Q values ranging from 100 to 1000 in air.

To enhance the measurement of force displacement curves, a modified form of atomic-force microscopy, referred to as interfacial force microscopy, has been developed. Interfacial force microscopes (IFMs) replace the cantilever with a differential-capacitance displacement sensor. Feedback is used to servo the net electrostatic torque of the sensor such that it cancels the torque resulting from tip-sample forces. As a consequence, the tip support remains at its rest position throughout the force profile. This feature eliminates the snap-to-contact instability which plagues weak cantilevers in the attractive force regime and correlates the tip-sample deformation directly to the vertical extension of the piezoelectric scanner in nanoindentation studies.

Feedback attempts to inhibit the common plate of the displacement sensor from actually deflecting which leads to rapid restabilization of the displacement sensor after hard collisions with pronounced surface features. However, this places considerable demands on the rate at which force signals drift since it is often necessary to image a large field of view at a slow lateral scan. Generally, a contact force in the range of 200 nN corresponds to a force signal in the order of 10 mV. As will be appreciated, the force signal has very little room to drift over the scan duration. A slow drift in the attractive force direction results in a slight increase in the contact force applied to the sample over the scan. Drifts in the repulsive force direction can pull the piezoelectric scanner completely out of feedback. Accordingly, improved imaging techniques are desired.

It is therefore an object of the present invention to provide a novel method and apparatus for intermittent imaging.

SUMMARY OF THE INVENTION

According to one aspect of the present invention there is provided an apparatus for intermittent contact imaging comprising:

a sensor to contact intermittently a sample to be imaged and generating displacement signals during oscillation thereof;

a scanner adjacent said sensor and supporting said sample to be imaged, said scanner being actuable to move said sample relative to said sensor to bring said sensor into intermittent contact with said sample; and a controller in communication with said sensor and said scanner, said controller including a sensor feedback circuit receiving said displacement signals and an AC setpoint signal, said AC setpoint signal having a frequency generally equal to the frequency at the peak of the displacement versus frequency curve of said sensor, the output of said sensor feedback circuit being applied to said sensor to oscillate the same, said controller further providing output to said scanner in response to said displacement signals to control the separation distance between said sensor and said sample.

According to another aspect of the present invention there is provided an interfacial force microscope comprising:

a differential-capacitance displacement sensor having a tip mounted on an oscillating member, said sensor generating displacement signals during oscillation of said member;

a scanner adjacent said sensor and supporting a sample to be imaged, said scanner being actuable to move said sample relative to said sensor to bring said tip into intermittent contact with said sample and to move said sample relative to said sensor to raster said sensor over said sample; and a controller in communication with said sensor and said scanner, said controller including a sensor feedback circuit receiving said displacement signals and an AC setpoint signal, said AC setpoint signal having a frequency generally equal to the frequency at the peak of the displacement versus frequency curve of said sensor, the output of said sensor feedback circuit being applied to said sensor to oscillate said member, said controller further providing output to said scanner in response to said displacement signals to control the separation distance between said sensor and said sample.

According to still yet another aspect of the present invention there is provided a method of imaging a sample surface comprising the steps of:

oscillating a sensor at a driven setpoint frequency to cause said sensor to intermittently contact a sample to be imaged;

generating displacement signals in response to oscillations of said sensor;

moving the sample relative to said sensor to maintain the separation distance between said sensor and sample; and rastering said sensor over the sample surface, wherein said driven setpoint frequency is generally equal to the frequency at the peak of the frequency versus displacement curve of said sensor.

The present invention provides advantages in that soft samples can be imaged on a microscopic level using a highly damped sensor while reducing the shear forces applied to the sample as the sample is scanned.

BRIEF DESCRIPTION OF THE DRAWINGS

An embodiment of the present invention will now be described more fully with reference to the accompanying drawings in which.

DETAILED DESCRIPTION OF THE PREFERRED EMBODIMENT

Figure 1:
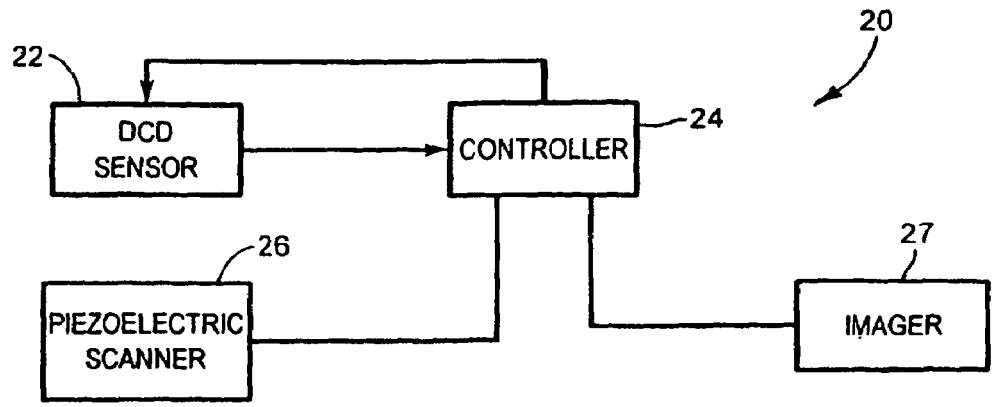
FIG. 1 is a schematic block diagram of an interfacial force microscope under force-feedback control configured to operate in an intermittent contact mode.

Referring now to FIG. 1, an interfacial force microscope (IFM) under force-feedback control and configured to operate in an intermittent contact mode to generate microscopic images of a sample under observation in accordance with the present invention is shown and is generally indicated to by reference numeral 20. As can be seen, the IFM 20 includes a differential-capacitance displacement (DCD) sensor 22 to contact intermittently the sample to be imaged. A controller 24 is coupled to the DCD sensor 22 as well as to a piezoelectric scanner 26 positioned adjacent the DCD sensor 22 and supporting the sample. The piezoelectric scanner 26 is responsive to the controller 24 to move the sample in a vertical direction to alter the sensor-sample separation. The piezoelectric scanner 26 is also actuable to move the sample laterally in an x-y plane to raster the DCD sensor 22 over the sample at a rate equal to about 2 to 3 μm/s. An imager 27 such as a NanoScope IIIa MultiMode manufactured by Digital Instruments receives output from the controller 24 and generates surface images of the sample. The controller 24 drives the DCD sensor 22 such that it operates in an intermittent contact mode while maintaining a high quality factor Q. The quality factor Q is of a value to achieve sufficient sensor output displacement signal contrast between out of contact and contact conditions of the DCD sensor 22 and the sample even though the DCD sensor is highly damped in air. Further details of the IFM 20 and in particular, the force-feedback control will now be described.

Figure 2:
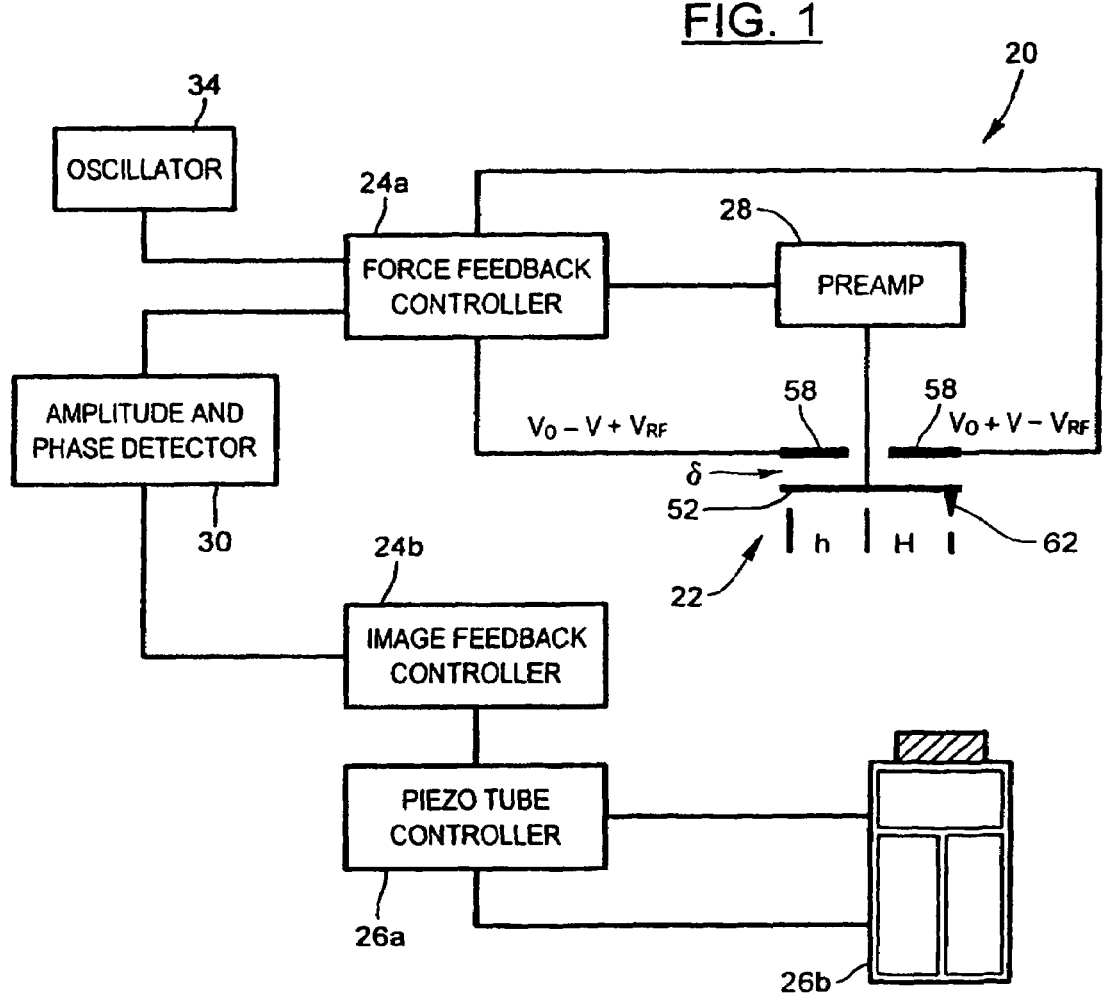
FIG. 2 is another schematic block diagram of the interfacial force microscope of FIG. 1 showing further detail.
Figure 3:
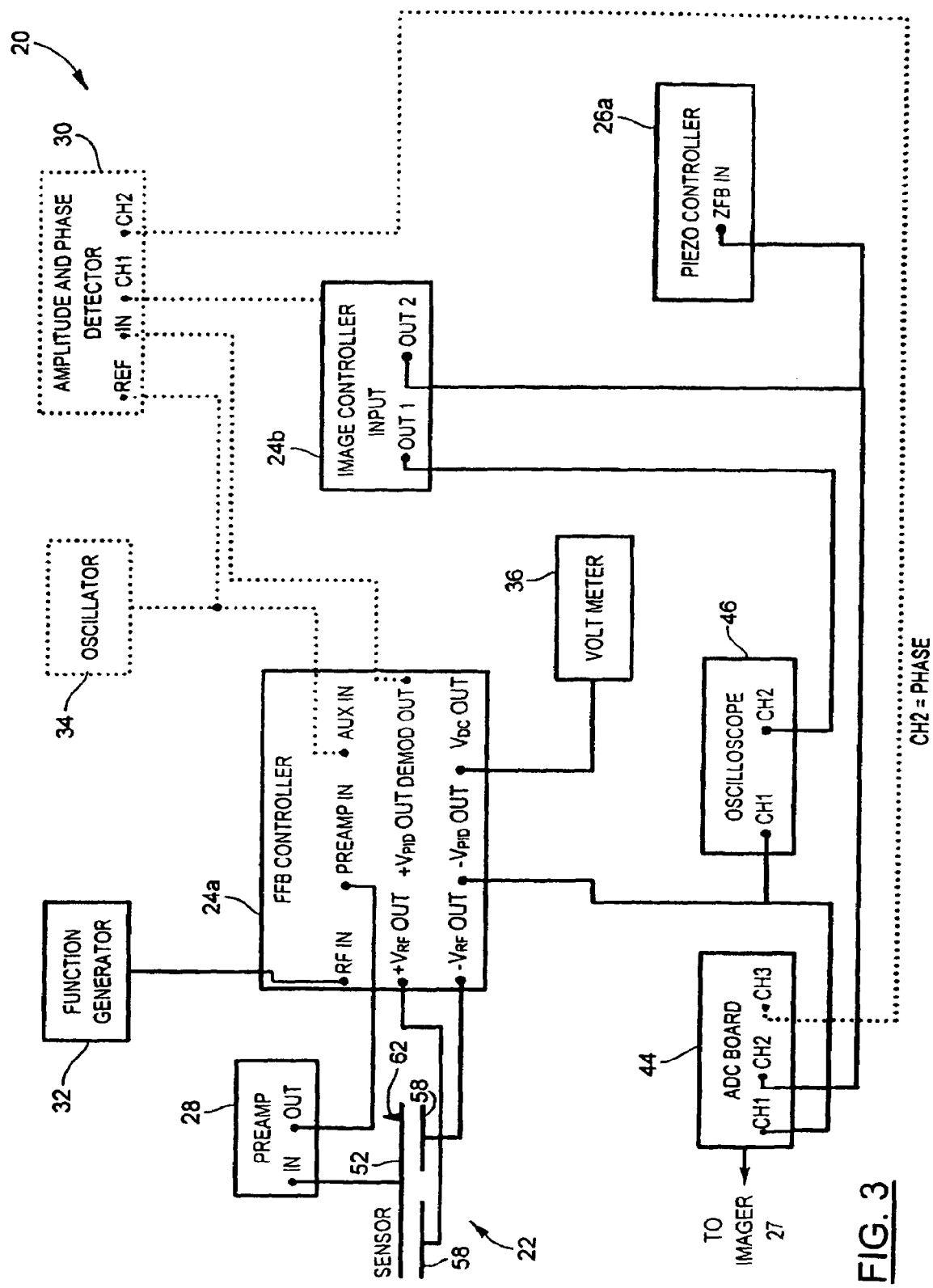
FIG. 3 is yet another schematic block diagram of the interfacial force microscope of FIG. 1 showing further detail.

FIGS. 2 and 3 better illustrate the IFM 20. As can be seen, the controller 24 includes a force-feedback (FFB) controller 24a and an image feedback (IFB) controller 24b. FFB controller 24a is responsible for driving the DCD sensor 22 and includes a feedback circuit tuned to establish a well defined peak within the displacement-frequency spectrum of the DCD sensor 22 sufficient to achieve the desired high quality factor Q. The IFB controller 24b is responsible for servoing the vertical extension of the piezoelectric scanner 26 to control the sensor-sample separation at each x,y coordinate of the sample being intermittently contacted by the DCD sensor 22. The FFB controller 24b is connected to the DCD sensor 22 directly as well as through a preamplifier 28. The preamplifier 28 has a high input impedance to inhibit excessive loading on the DCD sensor 22.

An amplitude and phase detector 30, a function generator 32, an oscillator 34 and optionally a volt meter 36 are also connected to the FFB controller 24a. The IFB controller 24b is connected to the amplitude and phase detector 30 and provides output to the piezo-controller 26a of the piezoelectric scanner 26. The piezo-controller 26a in turn drives the piezoelectric tube 26b of the piezoelectric scanner in the z-direction to alter the sensor-sample separation.

A multi-channel analog to digital converter (ADC) 44 is connected to the IFB controller 24b, the FFB controller 24a and the amplitude and phase detector 30. The ADC provides the output to the imager 27. An optional oscilloscope 46 is connected to the FFB and IFB controllers 24a and 24b respectively.

Figure 4:
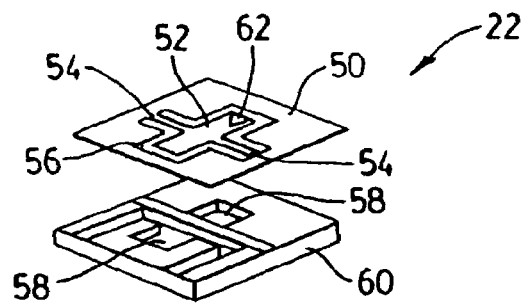
FIG. 4 is an enlarged, exploded perspective view of a differential-capacitance displacement sensor forming part of the interfacial force microscope of FIG. 1.

Turning to FIGS. 2 to 4, the DCD sensor 22 is better illustrated. As can be seen, the DCD sensor 22 includes a stainless steel or Beryllium-Copper (BeCu) common plate 50. A common plate 52 having a pair of torsion bars 54 extending in opposite directions from its sides is defined by a cut 56 in the common plate 50. The common plate 52 is disposed above a pair of gold or chromium electrodes 58 mounted on a quartz substrate 60. A tip 62 is attached to the common plate 52 by way of a conductive adhesive to help to reduce the mass of the DCD sensor 22. The tip 62 is fashioned from a wire having a diameter equal to about 0.125 mm by electrochemical etching and has a parabolic profile. The common plate 52 is connected to the input of the preamplifier 28.

The electrodes 58 are dc biased and are driven by RF driving signals output by the FFB controller 24a. The RF driving signals are 180 degrees out of phase and have a frequency well beyond the mechanical bandwidth of the DCD sensor 22 (i.e. 1 MHz) to establish an RF capacitance bridge defined by the electrodes 58 and common plate 52 that is sensitive to changes in capacitance at an aF level. The electrodes 58 are also driven by an AC setpoint signal generally in the range of from about 1 kHz to 1.5 kHz which causes the common plate 52 to oscillate as will be described. The frequency of the AC setpoint signal is a function of the mechanical properties of the DCD sensor material, its dimensions etc.

When the tip 62 encounters the sample supported by the piezoelectric scanner 26, a force is applied to the tip 62 resulting in torque being applied to the common plate 52. The applied torque causes the common plate 52 to rotate. Rotation of the common plate 52 changes the capacitance between the electrodes 58 and the common plate 52 and is detected by the RF capacitance bridge. When the common plate 52 rotates by a small angle $\theta \approx \delta/L$ where $\delta$ is the change in the average gap between the common plate 52 and one of the electrodes 58 and L is the distance between the mid-point of the torsion bar axis and the tip 62, a displacement signal appears on the common plate 52. The displacement signal has an amplitude equal to $2\Delta C V_{ac}/C_{Total}$, where $\Delta C$ is the change in capacitance, $V_{ac}$ is the amplitude of the RF driving signals and $C_{Total}$ is equal to two times the capacitance between the common plate 52 and one electrode 58 plus any stray capacitance in parallel with the DCD sensor 22. The displacement signal has a frequency equal to the frequency of the RF driving signals and a phase dependent on the direction of rotation of the common plate 52. The displacement signal on the common plate 52 is picked up by the preamplifier 28, amplified and conveyed to the FFB controller 24*a*.

Figure 5:
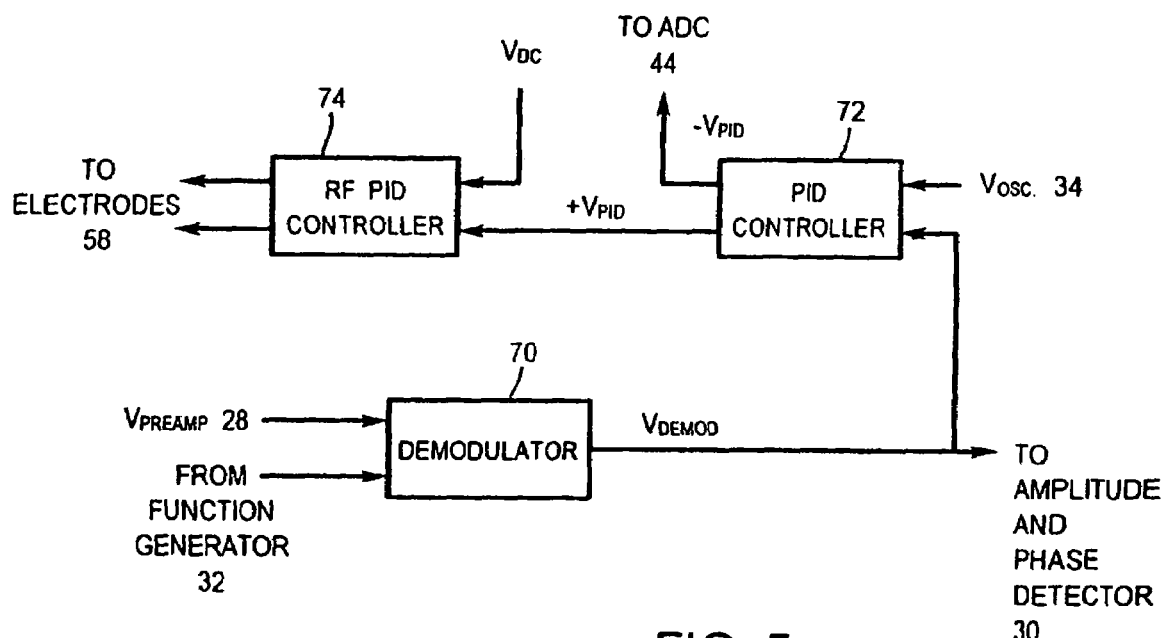
FIG. 5 is a schematic block diagram of a force-feedback controller forming part of the interfacial force microscope of FIG. 1.

FIG. 5 better illustrates the FFB controller 24*a*. As is shown, FFB controller 24*a* includes a demodulator 70 receiving the displacement signal output of the preamplifier 28 and the RF signal output of the function generator 32. The demodulator 70 demodulates and low pass filters the displacement signal output of the preamplifier 28 to generate demodulator amplitude signal output $V_{demod}$. The demodulator signal output $V_{demod}$ is applied to the amplitude and phase detector 30 and to a PID controller 72. The PID controller 72 also receives the AC setpoint signal output of the oscillator 34 and generates $V_{PID}$ and $-V_{PID}$ feedback signals. The $-V_{PID}$ feedback signal is conveyed to one of the channels of ADC 44 and to the oscilloscope 46 while the $V_{PID}$ feedback signal is conveyed to an RF PID controller 74. The RF PID controller 74 also receives a DC voltage and the RF signal output of the function generator 32 from the demodulator 70 and supplies the RF driving signals to each of the electrodes 58.

Figure 6:
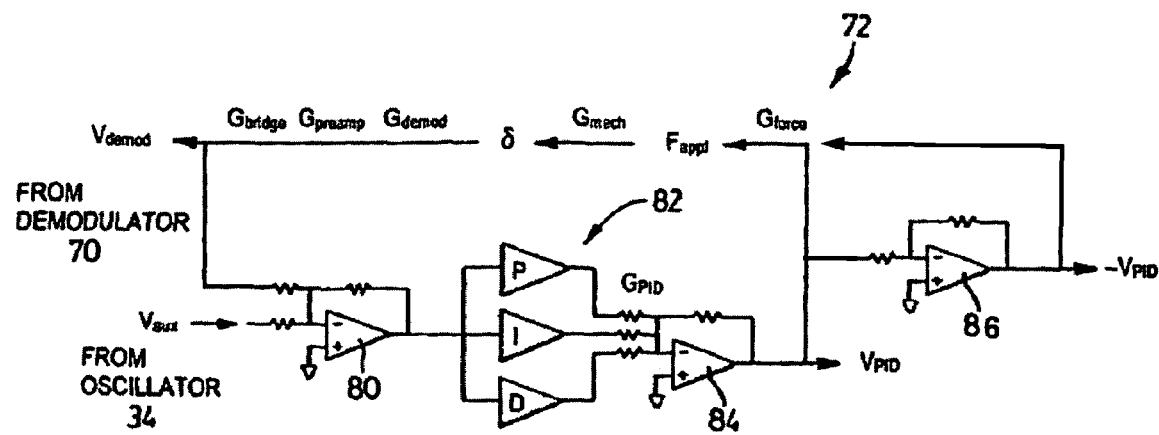
FIG. 6 is a block circuit diagram of a PID controller forming part of the force-feedback controller of FIG. 5.

The PID controller 72 is better illustrated in FIG. 6 and as can be seen, it includes a summing amplifier 80 having unity gain. The summing amplifier receives the demodulator signal output $V_{demod}$ as well as the AC setpoint signal $V_{aux}$ from oscillator 34. The sum output of the summing amplifier 80 is therefore $-(V_{aux}+V_{demod})$ and represents the error signal for the DCD sensor feedback loop. The sum output of the amplifier 80 is applied to a proportional-integral-derivative (PID) control block 82. The PID control block 82 has a good low frequency response and provides output proportional to the combination of its input, the time integral of its input and the time rate of change of its input. The output of the PID control block 82 is conveyed to a pair of summing amplifiers 84 and 86 functioning as high-pass filters, one amplifier 84 of which generates the $V_{PID}$ feedback signal and the other amplifier 86 of which generates the $-V_{PID}$ feedback signal. Since the summing amplifier 80 has unity gain, the gain $G_{PID}$ from the input of the PID control block 82 to the output of the summing amplifier 84 can be expressed as:

$$G_{PID}=-(G_P+G_I+G_D)$$

where:

$G_p$ is the proportional gain and is equal to $-1$;

$G_I$ is the integrator gain and is equal to $j/\omega T_I$;

$G_D$ is the derivative gain and is equal to $G_D=-\Gamma[j\omega T_D/(1+j\omega T_D)]$ over the frequency range of interest;

$T_I$ is the time constant of the integrator;

$T_D$ is the time constant of the differentiator; and $\Gamma$ represents the gain at the end of the high-pass filter circuit. The gain term $G_{PID}$ allows the frequency response of the DCD sensor feedback loop to be tailored.

If the frequency of the AC setpoint signal $V_{aux}$ is near dc, the setpoint signal $V_{aux}$ acts as the driven setpoint of the DCD sensor causing the DCD sensor 22 to oscillate physically such that the resulting feedback signal $V_{demod}$ output by demodulator 70 cancels the setpoint signal $V_{aux}$. In this case, the resulting error signal $-(V_{aux}+V_{demod})$ is basically equal to zero. When the AC setpoint signal $V_{aux}$ is moved to higher frequencies, the feedback system is unable to offset the AC setpoint signal $V_{aux}$ resulting in error signals which can be quite large.

Prior to imaging, the electronic gains of the integrator and differentiator of the PID controller 72 are adjusted such that the sensor displacement signal is nearly in-phase with the AC setpoint signal $V_{aux}$ at the frequency where the open loop gain falls to one (1). In other words, the feedback system has very little phase margin before it becomes unstable. However, the feedback system exhibits a much higher quality factor Q then if operated without feedback. The PID controller gain adjustments are chosen to obtain a quality factor Q high enough to be sensitive to perturbations caused by the tip striking the sample but not so large that noise becomes an issue. Noise becomes an issue when the quality factor Q is increased to a point where the phase margin becomes so small that the feedback system edges too close to the brink of instability.

Once tuning of the PID controller 72 has been completed, the displacement vs. frequency plot of the DCD sensor 22 is examined to find the frequency of maximum displacement. The frequency of the setpoint signal $V_{aux}$ is then set to the frequency of maximum displacement so that the DCD sensor 22 oscillates at this frequency. At this time, the piezoelectric scanner 26 is actuated to bring the sample towards the DCD sensor 22 so that the tip 62 intermittently contacts the sample as the common plate 52 oscillates. When the tip 62 contacts the sample, the amplitude of the DCD displacement signal decreases.

The amplitude and phase detector 30 applies the amplitude signal $V_{demod}$ to the IFB controller 24*b* which in turn outputs a magnitude signal to the piezo-controller 26*a* controlling the piezoelectric tube 26*b*. The imaging set point is set about 3% lower than the initial output of the amplitude and phase detector 30. The piezoelectric scanner 26 in turn moves the sample towards the DCD sensor 22 to control the separation between the tip 62 and the sample such that the displacement signal of the DCD sensor 22 is constant but lower than the in-air case. During this process, the piezoelectric scanner 26 is rastered in an x-y plane to image the surface of the sample under observation.

The error signals of the piezoelectric scanner feedback loop are applied to the ADC 44 which also receives phase input from the amplitude and phase detector 30 and the $V_{PID}$ feedback signal from the FFB controller 24*a*. The digital output of the ADC 44 is conveyed to the imager 27 to allow images to be formed. The error signals of the piezoelectric scanner feedback loop provide edge-contrast information of the sample surface topography while the phase of the displacement signal provides information related to energy dissipation during tip and sample contact.

By keeping the mass of the DCD sensor 22 low and establishing a well defined peak in $V_{demod}$, a high quality factor is maintained. This allows the DCD sensor to be operated in an intermittent contact mode while ensuring sufficient contrast between out of contact and contact displacement signals generated by the DCD sensor. As a result, high quality images of the sample under observation can be generated at a microscopic level.

Figure 7:
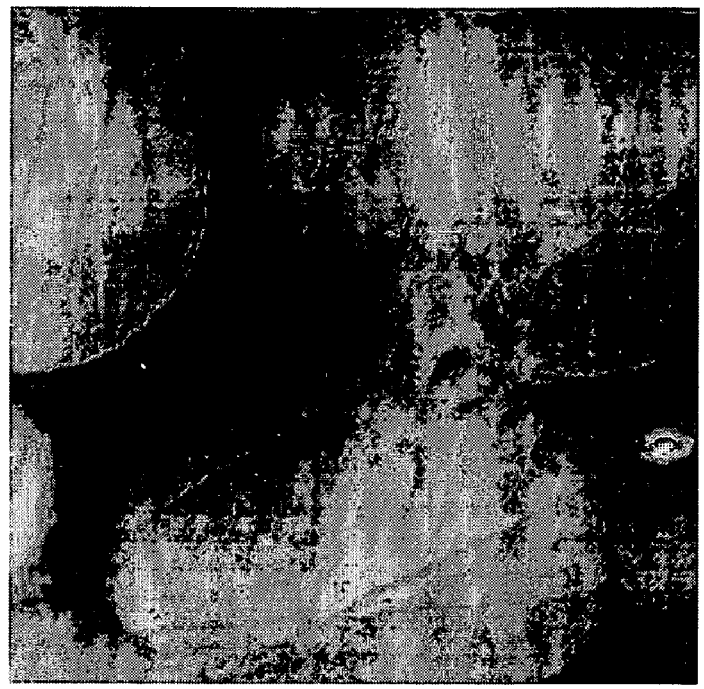
FIG. 7 shows a 1 kHz intermittent contact image of Kevlar fiber-epoxy taken using the interfacial force microscope of FIG. 1.

For a test sample, a fiber composite comprised of Kevlar 49 fibers imbedded in an epoxy matrix (the fiber volume fraction is reported to be 50%) was imaged using the IFM 20. Prior to imaging, the sample was polished. FIG. 7 shows a 1 kHz intermittent contact IFM image (all images: 180×180 points, plane subtraction, no filtering) of the fiber composite sample. The ~50 nm deep polishing grooves are clearly evident, in spite of a maximum height difference of ~740 nm. The piece of debris at the left edge remained undisturbed by the imaging procedure. The total imaging time was 11 min, corresponding to 20 contact cycles per point.

Figure 8:
FIG. 8 shows another 1 kHz intermittent contact image of Kevlar fiber-epoxy taken using the interfacial force microscope of FIG. 1 highlighting a damaged area.

FIG. 8 shows a 1 kHz intermittent contact IFM image of a badly damaged area on the Kevlar sample. The massive surface upheaval results in a maximum height difference approaching 3 μm, which deaccentuates the shallow polishing grooves in the unblemished fiber regions. In spite of the upheaval, the intermittent contact mode technique had little difficulty in tracking the surface topography, although optimum imaging required doubling the number of contact cycles per point.

To determine the peak contact force during imaging, the separation between the tip 62 and a single Kevlar 49 fiber was narrowed until the first evidence of intermittent contact was observed, and then the piezoelectric tube 26b was advanced until the set point was reached. After dividing the amplitude and phase detector output by the appropriate gain terms, it was estimated that the oscillation amplitude of the common plate 52 was reduced from 18.97 nm in air to 18.36 nm during intermittent contact (amplitudes being expressed as peak-to-peak values). The distance that the piezoelectric tube 26b advanced to reach the set point was 9.9 Å, which is to be compared to the 6.1 Å reduction in the common plate oscillation amplitude.

Figure 12:
FIG. 12 shows intermittent contact images of the surfaces of Hexadecane (3.34 cP) and Glycerol (1490 cP).
Figure 12:
Figure 12:

FIG. 12 shows intermittent contact images of the surfaces of Hexadecane (3.34 cP) and Glycerol (1490 cP). As will be appreciated, the DCD sensor 22 can be controlled under force-feedback to image soft as well as hard samples.

In the intermittent contact mode, the motion of the common plate 52 decays only during the contact portion of the cycle. Therefore, the difference between the advancement of the piezoelectric tube 26b and the reduction in common plate oscillation amplitude is a reasonable estimate of the maximum tip-sample deformation, which is about 3.8 Å.

To estimate the peak contact force, the Hertz equation for elastic contact which is appropriate for axis symmetric parabolic bodies is used:

$$F = \frac{4}{3} E^* \sqrt{R} * D^{3/2}$$

where:

$R = (1/R_t + 1/R_s)^{-1}$ $E^* = [(1-v_t^2)/E_t + (1-v_s^2)/E_s]^{-1}$ and is the reduced modulus;
D is the combined deformation of the tip and sample;
$v_t$, $v_s$ refer to Poisson's ratio;
$E_t$, $E_s$ indicate Young's modulus;

$R_t$, $R_s$ represent parabolic radii of curvature; and
t, s denote tip and sample.

Figure 9:
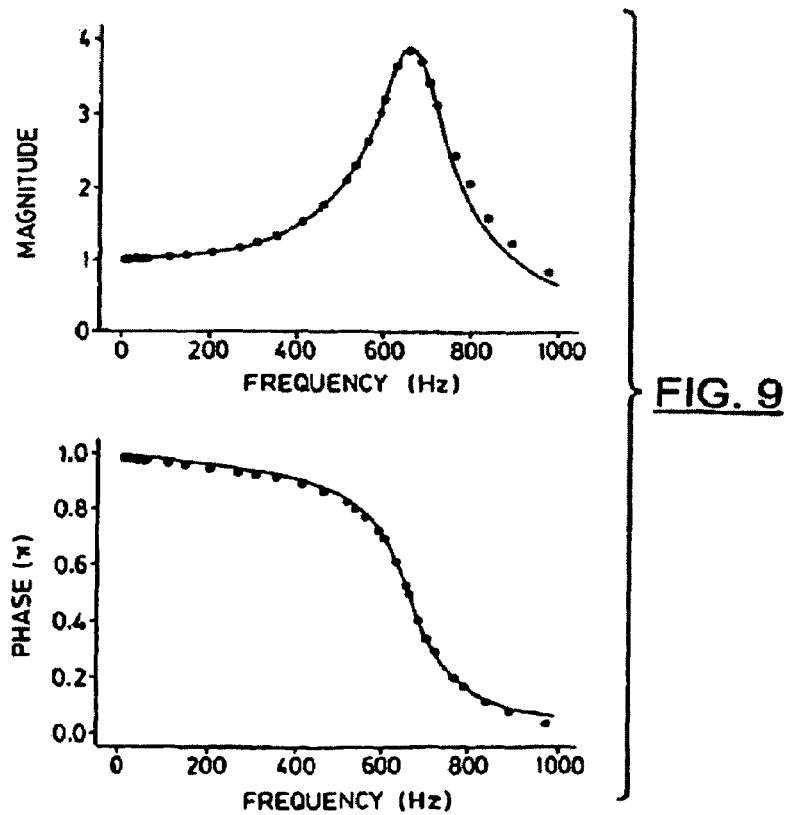
FIG. 9 shows graphs illustrating the magnitude and phase of the relationship between the ratio of $V_{demod}$ and $V_{aux}$ as a function of frequency when the differential-capacitance displacement sensor is operated in air.
Figure 10:
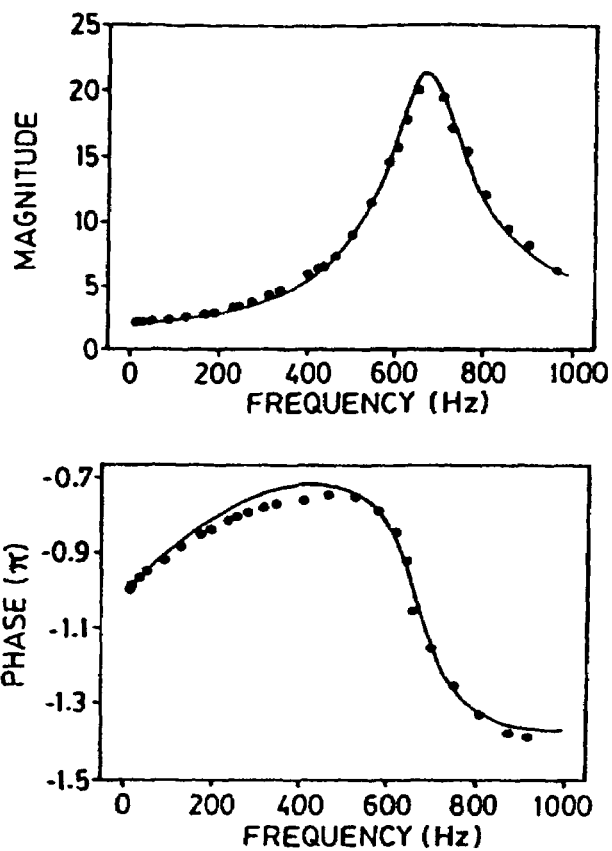
FIG. 10 shows graphs illustrating the magnitude and phase of the relationship between the ratio of $V_{PID}$ and $V_{aux}$ as a function of frequency when the differential-capacitance displacement sensor is operated in air.

To test the sensor feedback loop, the ratio $V_{demod}/V_{aux}$, and the ratio $V_{PID}/V_{aux}$, as a function of frequency were measured with the DCD sensor 22 operating in air. It is easy to show that theoretically $V_{demod}/V_{aux} = G_{OL}/(1-G_{OL})$ and $V_{PID}/V_{aux} = G_{PID}/(1-G_{OL})$, where $G_{OL} = G_{PID} G_{forcer} G_{mech} G_{bridge} G_{preamp} G_{demod}$ is the open loop gain, the minus sign being a result of the summing amplifier 80. FIGS. 9 and 10 show how these two ratios vary with frequency when the DCD sensor 22 operates under the following set of conditions:

$T1 = 4.3 \times 10^{-5} s$; $T_D = 3.6 \times 10^{-5} s$; $\Gamma = 2.4$; and $G_{demod} = 4.1$ $G_{demod}$ is referenced to the peak-to-peak amplitude of the preamplifier output. The solid line passing through the experimental points is the theoretical result. The level of agreement between theory and experiment ranges from good to excellent.

Of note in the magnitude plots is the presence of the well-defined peak occurring around 660 Hz signifying that the sensor feedback loop behaves much like a second-order low-pass filter. The origin of this behavior is rooted in Barkhausen's criterion for feedback stability. In other words, the term $1/(1-G_{OL})$ tends to infinity if the magnitude of $G_{OL}$ approaches unity and the corresponding phase approaches zero.

Figure 11:
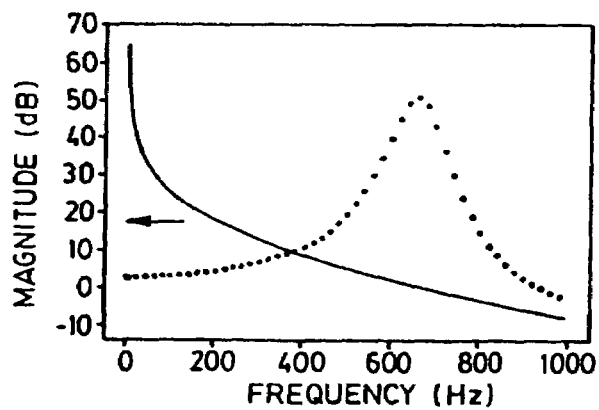
FIG. 11 shows graphs illustrating the magnitude and phase of the relationship between the open loop gain GOL as a function of frequency when the differential-capacitance displacement sensor is operated in air with the curves of FIG. 8 superimposed thereon.
Figure 11:
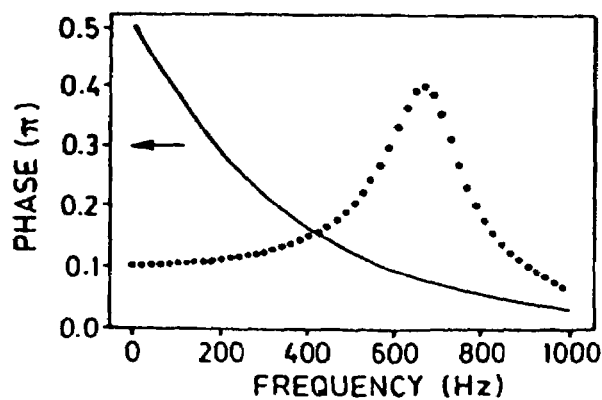

FIG. 11 shows the calculated frequency dependence of $G_{OL}$ with the magnitude plot for $V_{demod}/V_{aux}$ superimposed. As can be seen, the magnitude of $G_{OL}$ is roughly 0 dB (or 1) and the corresponding phase is about 0.08Π at the peak frequency for demodulator output signal $V_{demod}$. The phase margin is small enough to obtain a strong resonance response, but large enough to prevent the sensor feedback loop from going into self-oscillation. It is important to note that a peak in the demodulator output signal $V_{demod}$ does not mean mechanical resonance. In the example shown, the peak frequency for the demodulator output signal $V_{demod}$ is in fact 60 Hz lower than $\omega_0/2\Pi$, the mechanical resonant frequency of the DCD sensor 22. Nevertheless, a maximum in the demodulator output signal $V_{demod}$ does mean a maximum in the displacement amplitude, but this is not achieved in the usual way. Looking at the magnitude plot for $V_{PID}/V_{aux}$, it can be seen that the applied force varies over the frequency range, and reaches a maximum in the vicinity of the peak frequency for the demodulator output signal $V_{demod}$.

A comparison between the phase plots shows that the phase of the displacement (or $V_{demod}$) lags the phase of the force (or $V_{PID}$) by an angle reasonably close to Π/2. This, along with the fact that a 60 Hz difference in frequency is not very large, suggests that $\omega_0$ does play an important role in obtaining a strong peak, which can be understood in the following way. In order to obtain a strong peak and still maintain feedback stability, one must make $G_I$ the dominant electronic gain term because it is the only electronic gain that rolls off its response with increasing frequency, which means that the phase lag due to the electronics is not far removed from Π/2 over the frequency range of interest. The mechanical phase lag eventually reaches Π/2 at $\omega_0$, which yields an overall phase lag in the neighborhood of the Π phase lag required to bring the phase of $G_{OL}$ to zero.

As will be appreciated, the present invention provides advantages in that samples can be imaged on a microscopic level without damaging the samples. This makes the present imaging technique particularly suited to imaging soft samples including emulsions and liquids. Images can be taken for several hours without removing the varying dc offset in the force signal which is required during contact mode imaging to ensure minimal contact force between the tip and the sample.

Although the present invention has been described with specific reference to interfacial force microscopy and use of a differential-capacitance displacement sensor, those of skill in the art will appreciate that the feedback control used in the preset imaging technique can be used with other heavily-damped displacement sensors. It will also be appreciated by those of skill in the art, that variations and modifications may be made to the present invention without departing from the spirit and scope thereof as defined by the appended claims.

We claim:

1. A scanning probe microscope apparatus for increased-quality-factor intermittent contact imaging of a sample surface comprising:
   A. a device including 1) a base, 2) a member which is displaceable relative to the base, 3) a tip mounted on the member to intermittently contact the sample surface to be imaged, and 4) a characteristic of a quality factor;
   B. means for actuating the member;
   C. means for measuring displacements of the member relative to the base and generating a displacement signal indicative thereof;
   D. an oscillator generating a driving signal which includes characteristics of 1) a driving frequency and 2) a driving amplitude, the driving signal causing oscillations in the means for actuating which in turn causes the member to oscillate which in turn causes the displacement signal to oscillate;
   E. a feedback loop including a feedback controller, the feedback controller receiving 1) the displacement signal and 2) the driving signal and applying an oscillatory actuation signal to the means for actuating, the oscillatory actuation signal being mathematically dependent on 1) the displacement signal, 2) the driving signal, and 3) a gain function of the feedback controller, the feedback loop further including a characteristic of a quality factor, the gain function being such that the quality factor of the feedback loop is higher than the quality factor of the device when the tip is remote from the sample surface;
   F. a scanner for altering a separation distance between the sample surface and the device in a direction predominantly perpendicular to the sample surface and for imparting relative motions between the sample surface and the device in a plane predominantly parallel to the sample surface;
   G. an amplitude detector measuring a displacement amplitude from the displacement signal and generating a displacement amplitude signal indicative thereof, the displacement amplitude being smaller while the tip intermittently contacts the sample surface in comparison to when the tip is remote from the sample surface;
   H. a phase detector measuring a phase of the displacement signal with respect to a reference signal and generating a phase signal indicative thereof;
   I. means for controlling the scanner including means for 1) receiving the displacement amplitude signal, 2) setting a demanded displacement amplitude, 3) controlling the separation distance to bring the tip into intermittent contact with the sample surface and to maintain the displacement amplitude in general agreement with the demanded displacement amplitude while the tip intermittently contacts the sample surface, and 4) driving the relative motions to raster scan the sample surface; and
   J. an imager operatlively coupled to 1) the means for controlling the scanner, 2) the amplitude detector, and 3) the phase detector, the imager forming spatially-correlated images derived from 1) the separation distance, 2) a discrepancy between the displacement amplitude and the demanded displacement amplitude, and 3) the phase.

2. A scanning probe microscope in accordance with claim 1 wherein the displacements are displacements of rotation.

3. A scanning probe microscope in accordance with claim 1 wherein the displacements are displacements of torsion.

4. A scanning probe microscope apparatus in accordance with claim 1 wherein the quality factor of the device is indicative of the device being heavily damped even when the tip is remote from the sample surface yet wherein the quality factor of the feedback loop is sufficiently high to yield a well-defined resonance peak in a feedback-influenced displacement amplitude versus driving frequency spectrum of the device with the tip remote from the sample surface.

5. A scanning probe microscope apparatus in accordance with claim 1 wherein the tip interacts with a liquid while imaging.

6. A scanning probe microscope apparatus in accordance with claim 5 wherein the liquid includes a characteristic of an absolute viscosity as high as 1490 centipoise (cP).

7. A scanning probe microscope apparatus in accordance with claim 1 wherein the device further includes two electrodes stationary relative to the base and facing the member without contacting the member, the member being electrically conducting to define a pair of variable capacitors.

8. A scanning probe microscope apparatus in accordance with claim 7 wherein the means for actuating includes electrostatic/capacitive forces.

9. A scanning probe microscope apparatus in accordance with claim 1 wherein the oscillatory actuation signal includes a dc component derived from feedback which tends to maintain a constant do level of the displacements.

10. A scanning probe microscope apparatus in accordance with claim 1 wherein the tip includes a characteristic of a parabolic profile.

11. A scanning probe microscope apparatus in accordance with claim 1 wherein the driving frequency is equal to or near a frequency corresponding to a resonance peak of a feedback-influenced displacement amplitude versus driving frequency spectrum of the device with the tip remote from the sample surface.

12. A scanning probe microscope apparatus in accordance with claim 1 wherein the feedback loop further includes characteristics of an open-loop-gain magnitude and a phase margin, the phase margin nearly equaling zero (0) yet indicative of the feedback loop being stable at a frequency corresponding to the open-loop-gain magnitude equaling one (1) when the tip is remote from the sample surface.

13. A scanning probe microscope apparatus for increased-quality-factor intermittent contact imaging of a sample surface comprising:
   A. a device including 1) a base, 2) a member which is displaceable relative to the base, 3) a tip mounted on the member to intermittently contact the sample surface to be imaged, 4) a characteristic of a quality factor and 5) two electrodes stationary relative to the base and facing the member without contacting the member, the member being electrically conducting to define a pair of variable capacitors;
   B. means for actuating the member;
   C. means for measuring displacements of the member relative to the base and generating a displacement signal indicative thereof, wherein said measuring includes 1)

the pair of variable capacitors, 2) a pair of modulation signals nominally 180 degrees out of phase with respect to each other and sufficiently high in frequency to not displace the member relative to the base, 3) a preamplifier, 4) a demodulator, and 5) a low-pass filter;

D. an oscillator generating a driving signal which includes characteristics of 1) a driving frequency and 2) a driving amplitude, the driving signal causing oscillations in the means for actuating which in turn causes the member to oscillate which in turn causes the displacement signal to oscillate;

E. a feedback loop including a feedback controller, the feedback controller receiving 1) the displacement signal and 2) the driving signal and applying an oscillatory actuation signal to the means for actuating, the oscillatory actuation signal being mathematically dependent on 1) the displacement signal, 2) the driving signal, and 3) a gain function of the feedback controller, the feedback loop further including a characteristic of a quality factor, the gain function being such that the quality factor of the feedback loop is higher than the quality factor of the device when the tip is remote from the sample surface; and F. a scanner for altering a separation distance between the sample surface and the device in a direction predominantly perpendicular to the sample surface and for imparting relative motions between the sample surface and the device in a plane predominantly parallel to the sample surface.

14. An interfacial force microscope for increased-quality-factor intermittent contact imaging of a sample surface comprising:

A. a differential-capacitance displacement sensor including 1) a base, 2) a member which is rotationally displaceable relative to the base, 3) a tip mounted on the member to intermittently contact the sample surface to be imaged, 4) a characteristic of a quality factor, 5) two oppositely extending torsion bars supporting the member and 6) two electrodes stationary relative to the body and facing the member without contacting the member, the member being electrically conducting to define a pair of variable capacitors;

B. means for actuating the member via electrostatic/capacitive forces;

C. means for measuring rotational displacements of the member relative to the base and generating a displacement signal indicative thereof;

D. an oscillator generating a driving signal which includes characteristics of 1) a driving frequency and 2) a driving amplitude, the driving signal causing oscillations in the means for actuating which in turn causes the member to oscillate rotationally which in turn causes the displacement signal to oscillate;

E. A feedback loop including a force-feedback controller, the force-feedback controller including 1) a summing junction and 2) a control block, the summing junction receiving 1) the displacement signal and 2) the driving signal and generating an error signal indicative of a discrepancy between the displacement signal and the driving signal, the control block receiving the error signal and applying an oscillatory actuation signal to the means for actuating, the oscillatory actuation signal being mathematically dependent on 1) the error signal and 2) a gain function of the force-feedback controller, the feedback loop further including a characteristic of a quality factor, the gain function being such that the quality factor of the feedback loop is higher than the quality factor of the differential-capacitance displacement sensor when the tip is remote from the sample surface; and F. a scanner for altering a separation distance between the sample surface and the differential-capacitance displacement sensor in a direction predominantly perpendicular to the sample surface and for imparting relative motions between the sample surface and the differential-capacitance displacement sensor in a plane predominantly parallel to the sample surface.

15. An interfacial force microscope in accordance with claim 14 further comprising:

A. an amplitude detector measuring a displacement amplitude from the displacement signal and generating a displacement amplitude signal indicative thereof, the displacement amplitude being smaller while the tip intermittently contacts the sample surface in comparison to when the tip is remote from the sample surface;

B. a phase detector measuring a phase of the displacement signal with respect to a reference signal and generating a phase signal indicative thereof;

C. means for controlling the scanner including means for 1) receiving the displacement amplitude signal, 2) setting a demanded displacement amplitude, 3) controlling the separation distance to bring the tip into intermittent contact with the sample surface and to maintain the displacement amplitude in general agreement with the demanded displacement amplitude while the tip intermittently contacts the sample surface, and 4) driving the relative motions to raster scan the sample surface; and D. an imager operatively coupled to 1) the means for controlling the scanner, 2) the amplitude detector, and 3) the phase detector, the imager forming spatially-correlated images derived from 1) the separation distance, 2) a discrepancy between the displacement amplitude and the demanded displacement amplitude, and 3) the phase.

16. An interfacial force microscope in accordance with claim 14 wherein the quality factor of the differential-capacitance displacement sensor is indicative of the differential-capacitance displacement sensor being heavily damped even when the tip is remote from the sample surface yet wherein the quality factor of the feedback loop is sufficiently high to yield a well-defined resonance peak in a feedback influenced displacement amplitude versus driving frequency spectrum of the differential-capacitance displacement sensor with the tip remote from the sample surface.

17. An interfacial force microscope in accordance with claim 14 wherein the tip interacts with a liquid while imaging.

18. An interfacial force microscope in accordance with claim 17 wherein the liquid includes a characteristic of an absolute viscosity as high as 1490 centipoise (cP).

19. An interfacial force microscope in accordance with claim 14 wherein the means for measuring includes 1) the variable capacitors, 2) a pair of modulation signals nominally 180 degrees out of phase with respect to each other and sufficiently high in frequency to not displace the member relative to the base, 3) a preamplifier, 4) a demodulator, and 5) a low-pass filter.

20. An interfacial force microscope in accordance with claim 14 wherein the control block includes a characteristic of an integral, gain.

21. An interfacial force microscope in accordance with claim 20 wherein the oscillatory actuation signal includes a dc component derived from feedback which tends to maintain a constant dc level of the displacements.

22. An interfacial force microscope in accordance with claim 14 wherein the tip includes a characteristic of a parabolic profile.

23. An interfacial force microscope in accordance with claim 14 wherein the driving frequency is equal to or near a frequency corresponding to a resonance peak of a feedback-influenced displacement amplitude versus driving frequency spectrum of the differential-capacitance displacement sensor with the tip remote from the sample surface.

24. An interfacial force microscope in accordance with claim 14 wherein the feedback loop further includes characteristics of an open-loop-gain magnitude and a phase margin, the phase margin nearly equaling zero (0) yet indicative of the feedback loop being stable at a frequency corresponding to the open-loop-gain magnitude equaling one (1) when the tip is remote from the sample surface.

25. An interfacial force microscope in accordance with claim 20 wherein the control block further includes characteristics of proportional and derivative gains.

26. A method of increased-quality-factor intermittent contact imaging of a sample surface for a scanning probe microscope apparatus comprised of 1) a device including i) a base, ii) a member which is displaceable relative to the base, iii) a tip mounted on the member to intermittently contact the sample surface to be imaged, iv) a characteristic of a natural frequency ($\omega_o$), and v) a characteristic of a quality factor, 2) means for actuating the member, 3) means for measuring displacements of the member relative to the base and generating a displacement signal indicative thereof, 4) an oscillator generating a driving signal which includes characteristics of i) a driving frequency and ii) a driving amplitude, the driving signal causing oscillations in the means for actuating which in turn causes the member to oscillate which in turn causes the displacement signal to oscillate, and 5) a feedback loop including a feedback controller, the feedback controller receiving i) the displacement signal and ii) the driving signal and applying an oscillatory actuation signal to the means for actuating, the oscillatory actuation signal being mathematically dependent on i) the displacement signal, ii) the driving signal, and iii) a gain function of the feedback controller, the feedback loop further including a characteristic of a quality factor, the method comprising the steps of:
    A. setting the driving amplitude above zero and putting the device in a reference state such as but not limited to the tip remote from the sample surface;
    B. while the device is in the reference state:
        a. measuring a displacement amplitude from the displacement signal for a plurality of driving frequencies including the natural frequency and generating a feedback influenced displacement amplitude versus driving frequency spectrum of the device, and
        b. adjusting the gain function in a manner which causes—the spectrum to include a well-defined resonance peak indicative of the quality factor of the feedback loop being higher than the quality factor of the device;
    C. after adjusting the gain function:
        a. setting the driving frequency equal to or near a frequency corresponding to the resonance peak, and
        b. setting the driving amplitude such that the—displacement amplitude is proper for imaging; then
    D. putting the device in an imaging state in which the tip intermittently contacts the sample surface;
    E. while the device is in the imaging state:
        a. controlling a separation distance between the sample surface and the device in a manner which maintains the displacement amplitude in general agreement with a demanded displacement amplitude, the separation distance being in a direction predominantly perpendicular to the sample surface, the demanded displacement amplitude being lower than the displacement amplitude ultimately established in the reference state, and
        b. imparting relative motions between the sample surface and the device in a plane predominantly parallel to the sample surface to raster scan the sample surface
    F. measuring a phase of the displacement signal with respect to a reference signal while imaging the sample surface; and
    G. forming spatially-correlated images derived from 1) the separation distance, 2) a discrepancy between the displacement amplitude and the demanded displacement amplitude, and 3) the phase.

27. A method in accordance with claim 26 wherein the tip interacts with a liquid while imaging.

28. A method in accordance with claim 27 wherein the liquid includes a characteristic of an absolute viscosity as high as 1490 centipoise (cP).

29. A method in accordance with claim 26 wherein feedback loop further includes characteristics of an open-loop-gain magnitude and a phase margin, the phase margin nearly equaling zero (0) yet indicative of the feedback loop being stable at a frequency corresponding to the open-loop-gain magnitude equaling one (1) while the device is in the reference state.

30. A scanning probe microscope apparatus for increased-quality-factor intermittent contact imaging of a sample surface comprising:
    A. a device including 1) a base, 2) a member which is displaceable relative to the base, 3) a tip mounted on the member to intermittently contact the sample surface to be imaged, and 4) a characteristic of a quality factor;
    B. means for actuating the member;
    C. means for measuring displacements of the member relative to the base and generating a displacement signal indicative thereof;
    D. an oscillator generating a driving signal which includes characteristics of 1) a driving frequency equal to or near a frequency corresponding to a resonance peak of a feedback-influenced displacement amplitude versus driving frequency spectrum of the device with the tip remote from the sample surface and 2) a driving amplitude causing a displacement amplitude equal to or near 18.97 nanometer (nm) peak-to-peak when the tip is remote from the sample surface, the driving signal causing oscillations in the means for actuating which in turn causes the member to oscillate which in turn causes the displacement signal to oscillate;
    E. a feedback loop including a feedback controller, the feedback controller receiving 1) the displacement signal and 2) the driving signal and applying an oscillatory actuation signal to the means for actuating, the oscillatory actuation signal being mathematically dependent on 1) the displacement signal, 2) the driving signal, and 3) a gain function of the feedback controller, the feedback loop further including a characteristic of a quality factor, the gain function being such that the quality factor of the feedback loop is higher than the quality factor of the device when the tip is remote from the sample surface; and
    F. a scanner for altering a separation distance between the sample surface and the device in a direction predominantly perpendicular to the sample surface and for imparting relative motions between the sample surface and the device in a plane predominantly parallel to the sample surface.

31. An interfacial force microscope for increased-quality-factor intermittent contact imaging of a sample surface comprising:
  A. a differentially-capacitance displacement sensor including 1) a base, 2) a member which is rotationally displaceable relative to the base, 3) a tip mounted on the member to intermittently contact the sample surface to be imaged, and 4) a characteristic of a quality factor;
  B. means for actuating the member via electrostatic/capacitive forces;
  C. means for measuring rotational displacements of the member relative to the base and generating a displacement signal indicative thereof;
  D. an oscillator generating a driving signal which includes characteristics of 1) a driving frequency equal to or near a frequency corresponding to a resonance peak of a feedback influenced displacement amplitude versus driving frequency spectrum of the differential-capacitance displacement sensor with the tip remote from the sample surface and 2) a driving amplitude causing a displacement amplitude equal to or near 18.97 nanometer (nm) peak-to-peak when the tip is remote from the sample surface, the driving signal causing oscillations in the means for actuating which in turn causes the member to oscillate rotationally which in turn causes the displacement signal to oscillate;
  E. A feedback loop including a force-feedback controller, the force-feedback controller including 1) a summing junction and 2) a control block, the summing junction receiving 1) the displacement signal and 2) the driving signal and generating an error signal indicative of a discrepancy between the displacement signal and the driving signal, the control block receiving the error signal and applying an oscillatory actuation signal to the means for actuating, the oscillatory actuation signal being mathematically dependent on 1) the error signal and 2) a gain function of the force-feedback controller, the feedback loop further including a characteristic of a quality factor, the gain function being such that the quality factor of the feedback loop is higher than the quality factor of the differential-capacitance displacement sensor when the tip is remote from the sample surface; and
  F. a scanner for altering a separation distance between the sample surface and the differential-capacitance displacement sensor in a direction predominantly perpendicular to the sample surface and for imparting relative motions between the sample surface and the differential-capacitance displacement sensor in a plane predominantly parallel to the sample surface.

32. A method of increased-quality-factor intermittent contact imaging of a sample surface for a scanning probe microscope apparatus comprised of 1) a device including i) a base, ii) a member which is displaceable relative to the base, iii) a tip mounted on the member to intermittently contact the sample surface to be imaged, iv) a characteristic of a natural frequency ($\omega_0$), and v) a characteristic of a quality factor, 2) means for actuating the member, 3) means for measuring displacements of the member relative to the base and generating a displacement signal indicative thereof, 4) an oscillator generating a driving signal which includes characteristics of i) a driving frequency and ii) a driving amplitude, the driving signal causing oscillations in the means for actuating which in turn causes the member to oscillate which in turn causes the displacement signal to oscillate, and 5) a feedback loop including a feedback controller, the feedback controller receiving i) the displacement signal and ii) the driving signal and applying an oscillatory actuation signal to the means for actuating, the oscillatory actuation signal being mathematically dependent on i) the displacement signal, ii) the driving signal, and iii) a gain function of the feedback controller, the feedback loop further including a characteristic of a quality factor, the method comprising the steps of:
  A. setting the driving amplitude above zero and putting the device in a reference state such as but not limited to the tip remote from the sample surface;
  B. while the device is in the reference state:
    a. measuring a displacement amplitude from the displacement signal for a plurality of driving frequencies including the natural frequency and generating a feedback influenced displacement amplitude versus driving frequency spectrum of the device, and
    b. adjusting the gain function in a manner which causes the spectrum to include a well-defined resonance peak indicative of the quality factor of the feedback loop being higher than the quality factor of the device;
  C. after adjusting the gain function:
    a. setting the driving frequency equal to or near a frequency corresponding to the resonance peak, and
    b. setting the driving amplitude such that the displacement amplitude is proper for imaging, causing the displacement amplitude to be equal to or near 18.97 nanometer (nm) peak-to-peak; then
  D. putting the device in an imaging state in which the tip intermittently contacts the sample surface; and
  E. while the device is in the imaging state:
    a. controlling a separation distance between the sample surface and the device in a manner which maintains the displacement amplitude in general agreement with a demanded displacement amplitude, the separation distance being in a direction predominantly perpendicular to the sample surface, the demanded displacement amplitude being lower than the displacement amplitude ultimately established in the reference state, and
    b. imparting relative motions between the sample surface and the device in a plane predominantly parallel to the sample surface to raster scan the sample surface.

* * * * *